E. R. KERN.
NUT LOCK.
APPLICATION FILED APR. 24, 1907.
929,673.
Patented Aug. 3, 1909.
Fig. 1.
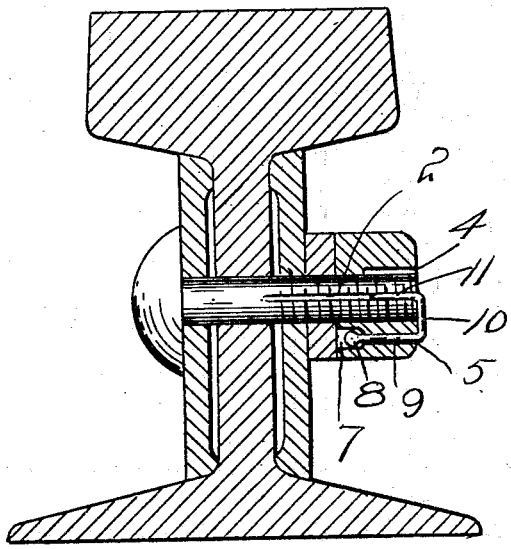
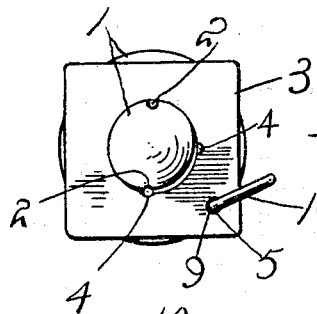
Fig. 2.
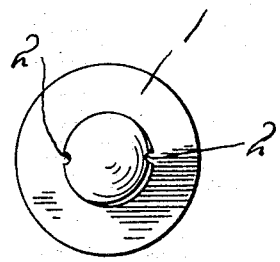
Fig. 3.
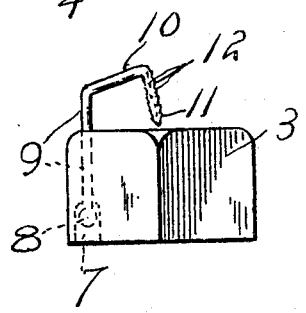
Fig. 4.
Witnesses
J. C. Simpson
John S. Powers
Inventor
Engelbert R. Kern.
By Chandler & Chandler
Attorneys

UNITED STATES PATENT OFFICE.

ENGELBERT R. KERN, OF FARIBAULT, MINNESOTA.

NUT-LOCK.

No. 929,673.   Specification of Letters Patent.   Patented Aug. 3, 1909.

Application filed April 24, 1907. Serial No. 370,037.

*To all whom it may concern:*

Be it known that I, ENGELBERT R. KERN, a citizen of the United States, residing at Faribault, in the county of Rice, State of Minnesota, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks and it has particular reference to a nut lock of that type which includes a displaceable key carried by the nut and formed for engagement with grooves cut into the nut or bolt or both.

In connection with a nut lock of the above type, the invention aims as a primary object to provide a novel construction, combination and arrangement of parts, the details of which will appear in the course of the following description, in which reference is had to the accompanying drawings, forming a part of this specification, like characters of reference designating similar parts throughout the several views, wherein:

Figure 1 is a transverse section of a rail joint provided with a nut lock constructed in accordance with the present invention. Fig. 2 is an end view of the nut. Fig. 3 is an end view of the bolt. Fig. 4 is a detailed side elevation of a nut in which is included a modified embodiment of the invention.

The bolt 1 has its threaded portion formed with any desired number of longitudinal parallel grooves 2, and the nut 3 has its threaded opening formed with grooves 4. The grooves 2 and 4 may be arranged so that the nut 3 may be locked at any desired degree of its rotation. The nut 3 has an opening 5 between its flat round faces, said opening being enlarged and rounded as at 7 at one end thereof. Within the enlarged portion 7 is disposed the rounded head 8 of a pin 9 which projects loosely through the opening 5 and is of sufficient length to be bent to overlie the nut as indicated at 10 in Fig. 1 and then bent parallel to its major portion as at 11 for insertion through a pair of grooves 2 and 4, when the latter register. In such insertion the pin 9 is designed for pivotal movement with respect to the nut in order to allow for the varying disposition of the registering grooves which may be employed, the head 7 serving to center said pin and affording a bearing in order that its pivoted movement may be easily effected.

In the modified embodiment illustrated in Fig. 4, that part of the pin which forms the portion 11 is provided with serrations 12 on all sides thereof to frictionally engage the surfaces of the grooves or to mutilate the threads in cases where a single groove is formed in one member and of sufficient size to accommodate the pin, the latter being preferably constructed of wire.

A nut lock constructed in accordance with the present invention is exceedingly simple in construction, inexpensive to manufacture, and practical and efficient in use.

From the foregoing description of my invention, it will be observed that I have provided a nut having a recess in its rear flat face in which recess is received the head of a pin which projects through an opening formed through the nut and opening through the front flat face thereof. The end portion of the pin opposite to its headed end is barbed, serrated, or roughened and the pin is bent so as to project at its barbed end into a pair of grooves one formed in the nut and the other in the bolt of the device. It will be noted that the grooves in the bolt are formed in opposite sides thereof, whereas the grooves in the bore of the nut are formed one upon each side of the radial line intersecting the opening in the nut and consequently spaced substantially ninety degrees apart. By reason of this construction, it will be understood that the pin may be swung for the engagement of its barbed end portion in either of the grooves in the nut and the advantage of providing two grooves and locating them in the manner stated, lies in the fact that should the nut, for example, be turned upon the bolt until one of the grooves of the bolt is positioned between the two grooves in the nut, and to unscrew the nut sufficiently to cause the one of the grooves therein to register with the groove in the bolt, would be impractical and undesirable, then the nut may be screwed upon the bolt even tighter until the other groove in the nut registers with the groove in the bolt.

What is claimed is:

In combination with a bolt having a plurality of evenly spaced grooves extending longitudinally thereof, a nut provided with a pair of grooves in the bore thereof, the angular distance whereof is one-half the angular distance between the grooves of the bolt, said nut being provided with a smooth longitudinal bore adjacent the periphery and having that portion next the contacting face of the nut countersunk to form an enlarged bore, and a U-shaped pin having one end held to rotate in the said bore and provided with a head of less depth than the countersunk portion of the bore and lying therein whereby said end has a limited longitudinal movement relative to the bore, the other end being adapted to enter the recess formed by the grooves of the bolt and nut when in register.

In testimony whereof, I affix my signature, in presence of two witnesses.

ENGELBERT R. KERN.

Witnesses:
  JOHN VOLZ,
  VALENTIN GRÄBENOR.